United States Patent [19]
Sanden

[11] Patent Number: 6,047,185
[45] Date of Patent: Apr. 4, 2000

[54] METHOD FOR TESTING HANDOVER IN MOBILE TELEPHONE NETWORKS

[75] Inventor: Magnus Sanden, Sollentuna, Sweden

[73] Assignee: Telia AB, Farsta, Sweden

[21] Appl. No.: 08/858,502

[22] Filed: May 19, 1997

Related U.S. Application Data

[63] Continuation of application No. 08/381,878, filed as application No. PCT/SE93/00578, Jun. 24, 1993, abandoned.

[30] Foreign Application Priority Data

Sep. 1, 1992 [SE] Sweden ................................ 9202504

[51] Int. Cl.$^7$ .................................................. H04B 17/00
[52] U.S. Cl. .......................... 455/446; 455/422; 455/436; 455/67.4
[58] Field of Search ..................................... 455/422, 423, 455/424, 436, 446, 525, 62, 67.1, 67.4, 226.1, 226.2

[56] References Cited

U.S. PATENT DOCUMENTS

| | | | |
|---|---|---|---|
| 4,977,399 | 12/1990 | Price et al. ............................... | 455/67.1 |
| 5,023,900 | 6/1991 | Tayloe et al. . | |
| 5,095,500 | 3/1992 | Tayloe et al. . | |
| 5,285,494 | 2/1994 | Sprecher et al. ........................... | 379/60 |
| 5,293,640 | 3/1994 | Gunmar et al. ............................ | 455/62 |
| 5,410,753 | 4/1995 | Szabo ...................................... | 455/67.4 |
| 5,418,843 | 5/1995 | Sternholm ............................... | 455/67.1 |
| 5,425,076 | 6/1995 | Knippelmier ............................ | 455/67.1 |
| 5,434,798 | 7/1995 | Madebrink et al. ..................... | 364/514 |
| 5,440,561 | 8/1995 | Werronen ................................ | 455/56.1 |
| 5,442,804 | 8/1995 | Gunmar et al. ........................... | 455/446 |

FOREIGN PATENT DOCUMENTS

92/02105 6/1992 WIPO .

OTHER PUBLICATIONS

Huff et al. "The Chicago Developmental Cellular System", 28th IEEE Vehicular Technology Conference, pp. 86–72, Mar. 1978.

*Primary Examiner*—Reinhard J. Eisenzopf
*Assistant Examiner*—Lester G. Kincaid
*Attorney, Agent, or Firm*—Oblon, Spivak, McClelland, Maier & Neustadt, P.C.

[57] ABSTRACT

A method for testing handover in mobile telephone networks. A test mobile passes through relevant traffic routes while transmitting a radio signal and registering its position. Actual base stations synchronously measure the signal strength which is received from the test mobile. The values obtained are compiled with respect to time and respective registered position of the test mobile in a measurement database. Handover can then be tested by varying selected handover parameters during a time-based play back with the aid of the measurement database. The measurement is thus carried out in the uplink which provides a realistic basis for determining a desired handover algorithm. A single measurement process makes it possible to test a large number of algorithms without disturbing the network.

4 Claims, 2 Drawing Sheets

METHOD FOR TESTING HANDOVER IN MOBILE TELEPHONE NETWORKS

This application is a Continuation of application Ser. No. 08/381,878, filed on Feb. 17, 1995, now abandoned, which was filed as a 371 of PCT/SE93/00578 on Jun. 24, 1993.

FIELD OF THE INVENTION

The present invention relates to a method for testing handover in mobile telephone networks. The invention utilises a new measuring technique which measures signal strengths in the uplink. The measuring technique thereby provides a realistic basis for testing handover parameters and algorithms.

PRIOR ART

The basis for decisions for handover algorithms in mobile telephone networks is based on the signal strength which the base stations measure at the transmitter frequency of the mobile station, that is to say in the uplink. The signals strength from a mobile station which has a call connected via a base station can easily be measured from one or more base stations on the current frequency channel of the mobile in the uplink. The coverage measurements which form the basis of the mobile telephone system, however, are made in the downlink, that is to say the signal strengths from different base stations are measured at a mobile. However, measurements have shown that an unbalance can arise locally between uplink and downlink. The uplink and the downlink are thus not identical and in certain cases quite different from one another which has led to problems with handovers in the system. Measuring the signal strength in the uplink has previously not been used since there has not been a possibility to follow the call when it is moved over to another base station and at the same time changes frequency channel.

SUMMARY OF THE INVENTION

The present invention provides a method which solves the above-mentioned problem by the signal strength from a test mobile being measured at the same time at a number of base stations, that is to say measuring in the uplink.

According to the invention, a test mobile is allowed to pass through relevant traffic routes while it is transmitting a radio signal and is registering its position. Existing base stations synchronously measure the signal strength which is received from the mobile. The measurement values obtained are compiled with reference to the time and respective registered position of the test mobile in a measurement database. The handover can then be tested by varying the selected handover parameters and algorithms and by playing back the time characteristic with the aid of the measurements stored in the measurement database.

The invention is specified in more detail in subsequent patent claims.

DETAILED DESCRIPTION OF PREFERRED EMBODIMENTS OF THE INVENTION

Figure 1:
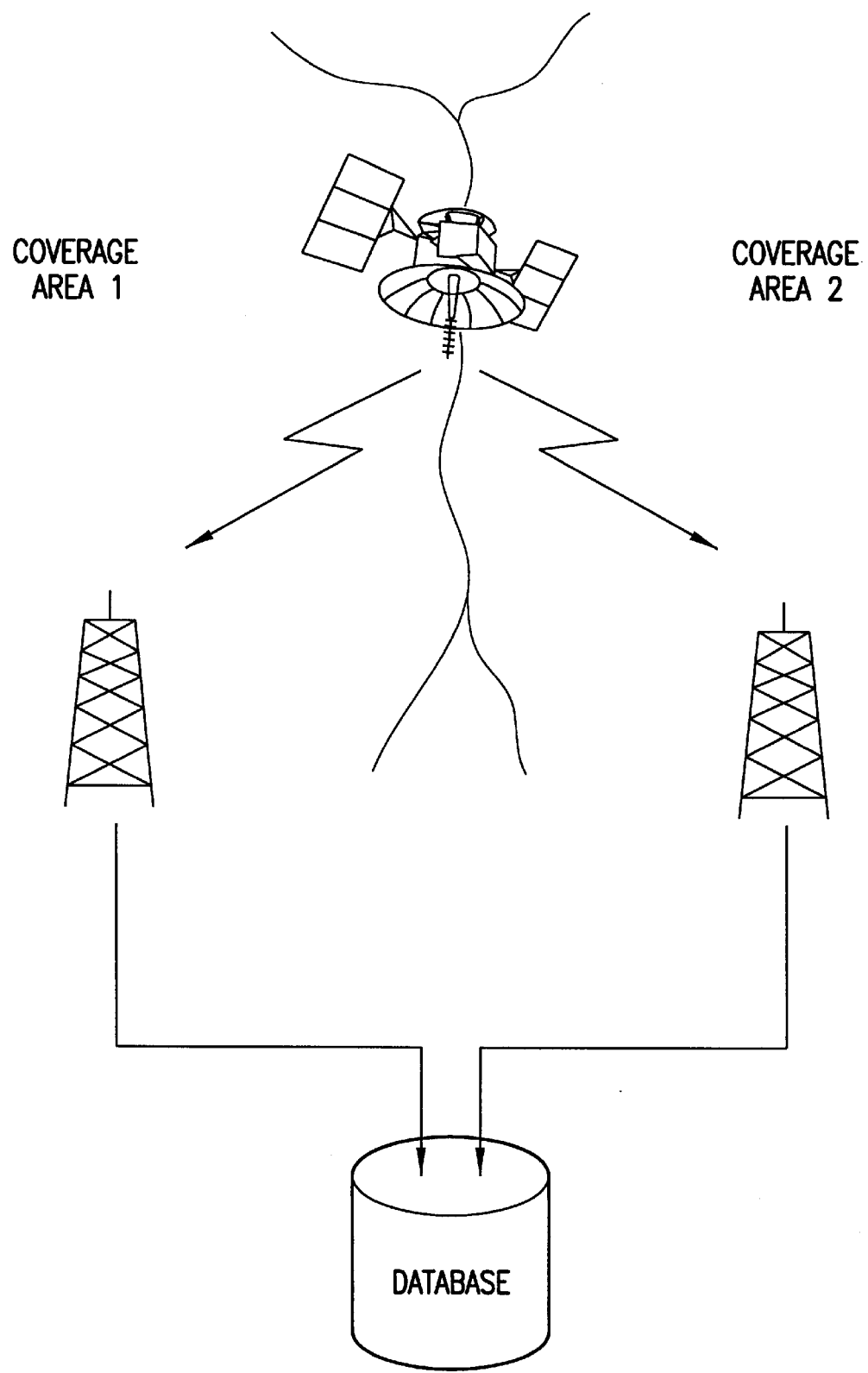
FIG. 1 is a block diagram showing a system according to the present invention.
Figure 2:
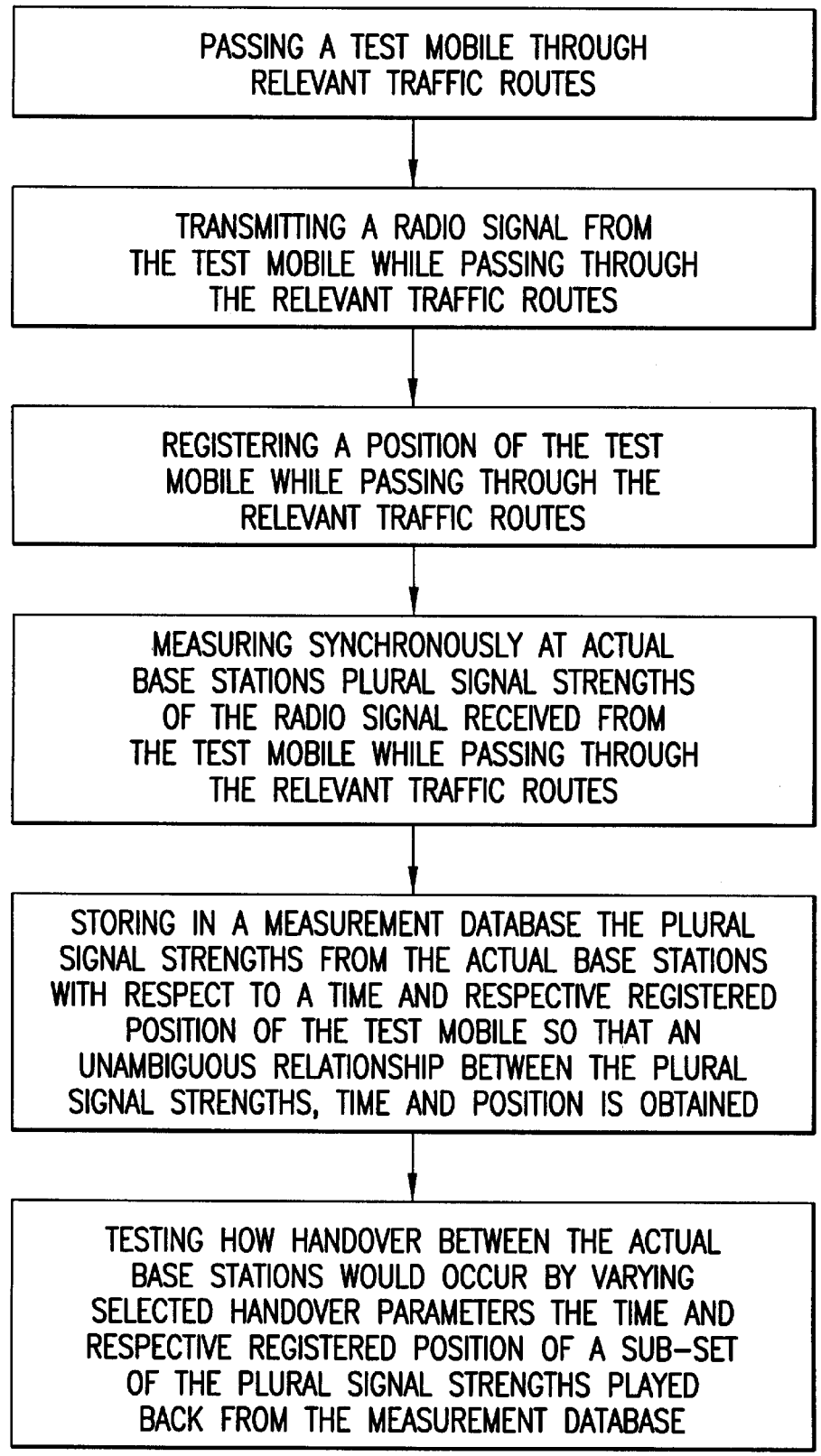
FIG. 2 is a flowchart showing the operation of the present invention.

Mobile telephone networks are made up of radio base stations which have a limited coverage range, within which it is possible to have a telephone call connected. When a mobile station which, for a call via a base station, approaches the limit of the coverage area of the base station, the call must be moved over to another base station. At the same time as the call is moved over to a new base station, the mobile will begin to transmit on a different frequency channel from before. The mobile thus changes both base station and frequency. If this is not done, the call will be interrupted. The function which makes handover possible between two base stations is central to the mobile telephone system and without it mobility cannot be offered.

In the algorithm which controls handover of mobile stations between different base stations, a number of parameters is included which can be individually set for each base station. It is desirable to be able easily to test a number of different handover algorithms in order to find the algorithm which is the best for a specific area or for a specific route.

As mentioned above, the basis for decisions for handover algorithms in mobile telephone systems, for example NMT, is based on the signal strength which the base stations measure at the transmitter frequency of the mobile station, that is to say in the uplink. In order to obtain an adequate basis for testing handover algorithms, it is thus necessary to measure the signal strength of a mobile station at the same time from several base stations whilst the mobile station is moving between different base stations.

The present invention solves the problem by following a mobile station at the same time as the signal strength is measured from several base stations. After that, an arbitrary number of handover algorithms can be tested in a computer environment.

The aim of the invention is to measure the received signal strength in the uplink since the handover decision is based on this. The method will approach reality as close as possible and affect the network as little as possible. The method will provide for testing of the parameters which control handover and it will be possible to use it for setting up suitable neighbouring base stations which will be included in the handover algorithm.

According to the invention, a test mobile is allowed to pass through relevant traffic routes. Since it is the handover between base stations which will be investigated, the traffic routes are generally located on the outer edge of the respective coverage areas. The test mobile continuously transmits a carrier wave at a predetermined frequency. This frequency may not be used in the network during the measuring. The method thus only takes up one frequency channel. The geographic position of the test mobile is determined with the aid of a suitable position-finding system. The position of the mobile is stored together with the time at the actual position.

The measuring equipment together with the storage medium are placed at the base stations which are of interest for taking measurements from. Measuring is carried out at the transmitter channel of the mobile, for example every second, and the measurement value is stored together with the current time in the storage medium. The measuring equipment of the base stations will be synchronised in time so that the measurement is carried out at the same time. Synchronisation can be carried out via the radio channel initiated from the mobile. After the measurement, a connection thus exists between the position of the mobile and the signal strength of the mobile measured in the uplink by a number of base stations due to the time synchronisation. The measurement results are compiled in a measurement database.

The measurement data can then be post-processed in a computer environment. The compiled volume of data can be seen as a number of signal strength curves which vary in time and space. Using these signal strength curves as input data, different handover algorithms can be tested with intent to produce the one with the desired function. The algorithms can be tested, for example, by varying different parameters such as noise parameters and hysteresis, and by varying the choice of neighbouring base stations.

The invention can advantageously be used as a training aid and as a planning/trimming aid. The following applications can be identified.

Training: A large number of parameters are involved in the handover procedure. The invention can be used for obtaining knowledge about the function of different parameters and how they affect handover.

Planning: Development of parameter set-ups suitable for different environments (municipal environment, countryside and so forth) is possible.

Trimming: In an existing network, optimisation is necessary and for each base the individual setting of parameters. Moreover, the tool can be of help in developing suitable handover boundaries. In a network which is continuously extended and changed, this application is of special importance.

The method according to the invention thus comprises only one measuring case and yet provides for tests of a large number of different algorithms without the network being disturbed. The measurement is carried out in the uplink which provides a realistic basis for determining a desired handover algorithm. The method also eliminates the problem of following a mobile station during the measurement of its signal strength. The scope of the invention is limited only by the subsequent patent claims.

I claim:

1. A method for testing handover in mobile telephone networks, comprising the steps of:

passing a test mobile through relevant traffic routes, transmitting a radio signal from the test mobile while passing through the relevant traffic routes, registering a position of the test mobile while passing through the relevant traffic routes, measuring synchronously at actual base stations plural signal strengths of the radio signal received from the test mobile while passing through the relevant traffic routes, storing in a measurement database the plural signal strengths from the actual base stations with respect to a time and respective registered position of the test mobile so that an unambiguous relationship between signal strengths, time and position is obtained, playing back the time and respective registered positions of a sub-set of the plural signal strengths from the measurement database, varying handover parameters, and testing how handover between a simulated mobile and the actual base stations would occur by using the varied handover parameters and the time and respective registered positions played back from the measurement database.

2. Method as claimed in claim 1, wherein the step of measuring synchronously comprises measuring the signal strengths of the radio signal received from the test mobile synchronously once per second.

3. Method as claimed in one of claims 1 or 2, wherein the step of measuring synchronously comprises synchronizing using the radio signal transmitted from the test mobile.

4. The method as claimed in claim 1, wherein the step of transmitting comprises transmitting the radio signal from the test mobile while passing along a traffic route on a boundary between two coverage areas.

* * * * *